United States Patent
Ishikawa et al.

(10) Patent No.: US 11,068,851 B2
(45) Date of Patent: Jul. 20, 2021

(54) EXCHANGING MESSAGES DURING A CHAT SESSION

(71) Applicant: Airbnb, Inc., San Francisco, CA (US)

(72) Inventors: Nobuyuki Ishikawa, Yokohama (JP); Kazuhiro Konno, Ichikawa (JP); Akira Saitoh, Ichikawa (JP); Shigeki Takeuchi, Meguro-ku (JP); Hayato Uenohara, Funabashi-chi (JP)

(73) Assignee: Airbnb, Inc., San Francisco, CA (US)

( * ) Notice: Subject to any disclaimer, the term of this patent is extended or adjusted under 35 U.S.C. 154(b) by 61 days.

(21) Appl. No.: 15/829,980

(22) Filed: Dec. 3, 2017

(65) Prior Publication Data

US 2018/0096305 A1 Apr. 5, 2018

Related U.S. Application Data

(63) Continuation of application No. 12/577,903, filed on Oct. 13, 2009, now Pat. No. 9,836,723.

(30) Foreign Application Priority Data

Dec. 2, 2008 (JP) .............................. JP2008-307201

(51) Int. Cl.
*G06F 15/16* (2006.01)
*G06Q 10/10* (2012.01)
*H04L 12/18* (2006.01)
*H04L 12/58* (2006.01)

(52) U.S. Cl.
CPC ....... *G06Q 10/107* (2013.01); *H04L 12/1813* (2013.01); *H04L 51/04* (2013.01)

(58) Field of Classification Search
CPC .... G06Q 10/107; H04L 12/1813; H04L 51/04
(Continued)

(56) References Cited

U.S. PATENT DOCUMENTS

| 9,836,723 B2 | 12/2017 | Ishikawa et al. |
| 2003/0093363 A1 | 5/2003 | Horsfall et al. |

(Continued)

FOREIGN PATENT DOCUMENTS

| JP | 2002163219 A | 6/2002 |
| JP | 2005527878 A | 9/2005 |

(Continued)

OTHER PUBLICATIONS

U.S. Appl. No. 12/577,903, Non-Final Office Action, dated Dec. 5, 2012, 21 pg.

(Continued)

*Primary Examiner* — George C Neurauter, Jr.
*Assistant Examiner* — Joel Mesa
(74) *Attorney, Agent, or Firm* — Schwegman Lundberg & Woessner, P.A.

(57) ABSTRACT

Message display control means updates and displays messages sequentially on a message list screen each time message receiving means receives a message. When input detection means detects a response message, identification means identifies the latest message at the time of detection and the response message. Response message sending means sends the response message as a response to the identified message to other participants upon completion of input of the response message. Therefore, even in the case where the message list screen is updated due to receiving the subsequent message during the input of the response message, the completed response message is able to be sent back to the response object message.

18 Claims, 7 Drawing Sheets

(58) Field of Classification Search
USPC .................................................. 709/206, 204
See application file for complete search history.

(56) References Cited

U.S. PATENT DOCUMENTS

| | | | |
|---|---|---|---|
| 2004/0015553 A1 | 1/2004 | Griffin et al. | |
| 2006/0031361 A1* | 2/2006 | Bailey | H04L 51/04 709/206 |
| 2006/0161849 A1* | 7/2006 | Miller | G06F 9/451 715/744 |
| 2006/0271630 A1* | 11/2006 | Bensky | G06Q 10/107 709/206 |
| 2008/0109406 A1* | 5/2008 | Krishnasamy | G06Q 10/107 |
| 2009/0119371 A1* | 5/2009 | Chang | H04L 12/1827 709/206 |
| 2009/0228944 A1* | 9/2009 | Bodlaender | H04L 12/1827 725/110 |
| 2010/0138503 A1 | 6/2010 | Ishikawa et al. | |

FOREIGN PATENT DOCUMENTS

| | | |
|---|---|---|
| JP | 2008070994 A | 3/2008 |
| JP | 4782822 B2 | 9/2011 |
| KR | 20040045189 A | 6/2004 |
| KR | 20050055688 A | 6/2005 |
| KR | 20100062953 A | 6/2010 |

OTHER PUBLICATIONS

U.S. Appl. No. 12/577,903, Final Office Action, dated Feb. 28, 2013, 25 pg.

U.S. Appl. No. 12/577,903, Non-Final Office Action, dated Jun. 21, 2013, 22 pg.

U.S. Appl. No. 12/577,903, Final Office Action, dated Nov. 22, 2013, 26 pg.

U.S. Appl. No. 12/577,903, Non-Final Office Action, dated Apr. 25, 2014, 27 pg.

U.S. Appl. No. 12/577,903, Final Office Action, dated Jul. 16, 2014, 31 pg.

U.S. Appl. No. 12/577,903, Examiner's Answer, dated Jan. 21, 2016, 27 pg.

U.S. Appl. No. 12/577,903, Decision on Appeal, dated May 8, 2017, 11 pg.

U.S. Appl. No. 12/577,903, Notice of Allowance, dated Jul. 28, 2017, 10 pg.

* cited by examiner

EXCHANGING MESSAGES DURING A CHAT SESSION

CROSS-REFERENCE TO RELATED APPLICATIONS

This application claims the benefit of Japanese Patent Application No. 2008-307201 filed 2 Dec. 2008, entitled "Message Exchange Device, Message Exchange Method, And Message Exchange Program", which is assigned to the assignee of the present application, and the teachings of which are hereby incorporated by reference in their entirety.

BACKGROUND

The present invention relates to a device, method, and program for exchanging messages with other participants in a chat session.

In the Internet, there has been known a chat system in which a plurality of users send messages in real time. The chat system provides a mechanism for displaying messages from others sequentially on a display screen of a receiver-side personal computer (PC) upon connecting to a chat server.

A problem which may occur in this type of chat system will be described below with reference to an example of a list screen 200 shown in FIG. 10 (Prior Art). First, as shown in FIG. 10(a), the list screen 200 sequentially displays a list of messages from participants A and B. Moreover, an input of a response message to the participant B is started in an input field 201 of the list screen 200. If a new message is received from a participant C during the input process, the messages from the participants A, B, and C are displayed in this order on the list screen 200. Upon completion of the user's input, the list screen 200 displays the user's input message "It won't be true" subsequently to the message of the participant C as shown in FIG. 10(b). This causes a problem that the message to the participant B looks like a message to the participant C. Further, in cases where the user receives a lot of messages from a plurality of other users in addition to the participant C during the input by the user, still more message appear between the response message and the message corresponding thereto. In these cases, there is a problem that the correspondence between the messages is more difficult to understand and therefore it has been difficult to establish a conversation.

Moreover, Japanese Patent Application Publication No. 2008-70994 discloses that a message exchange terminal is configured to transmit status information indicating an input status based on an input history by a message sender on an input interface to other message exchange terminals each put in a message exchangeable status and that other message exchange terminals are then able to receive the status information and to display the status information at the message display position of the message sender in a message log display region. This type of message exchange terminal, however, needs to monitor the input status, which thereby causes a problem of complicated processing. Moreover, in cases where it took time to input a response, the user might receive messages from a lot of other users and the status information is therefore not able to be displayed on the same display screen.

SUMMARY

One aspect of the disclosure enables a message to be sent back as a response message to a message which is an object of the response even in cases where a new message is received during input of the response message.

The disclosure provides a message exchange device for exchanging messages with other participants in a chat session, comprising: message receiving means for receiving messages from the other participants; message display control means for updating and displaying the messages sequentially on a message list screen each time the message receiving means receives a message; input detection means for detecting input of a response message as a response to the message; identification means for identifying the response message detected by the input detection means and the latest message displayed on the message list screen at the time of detection of the response message; and response message sending means for sending the other participants the response message as a response to the message identified upon completion of input of the response message.

According to the message exchange device of the disclosure, the messages are displayed sequentially on the list screen showing a list of the messages of the participants each time a message is received from any of the other participants. Further, upon the detection of the input of the response message to the message, the message exchange device identifies the response message and the latest message displayed on the message list at the time of detection of the response message. Thereafter, upon completion of input of the response message, the message exchange device sends the response message as a response corresponding to the identified message to other participants. Thus, when the participant inputs the response message, the latest message on the message list is identified for the response message. Therefore, even if a subsequent message is received and the message list screen is updated during the input of the response message, the completed response message is able to be sent back to the response object message. Moreover, the participant does not need to select and set the response object message. Therefore, the participant is able to identify the response message and the response object message only by starting the input of the response message. The same applies to the message exchange method and the message exchange program according to the disclosure.

In the foregoing message exchange device, the response message sending means may be means for adding corresponding identification information for distinguishing the message, which is identified for the response message, to the response message before sending the response message. According thereto, the corresponding identification information is added to the response message to be sent back and therefore the message receiving device only needs to detect the message corresponding to the received response message on the basis of the corresponding identification information, which thereby simplifies the processing of the response message receiving device. The same applies to the message exchange method and the message exchange program according to the disclosure.

Further, in the foregoing message exchange device, the message display control means may be means for displaying the message identified for the response message by the identification means so as to be distinguishable from other messages on the message list screen. According thereto, the message list screen is displayed so that the message identified for the response message being input is distinguishable from other messages. Therefore, even in the case where the message list screen is updated upon receiving a new message during input of the response message, a user is able to quickly recognize the response object message from the message list screen. The same applies to the message exchange method and the message exchange program according to the disclosure.

Moreover, the foregoing message exchange device may further comprise identification change means for changing the message identified for the response message from the message identified by the identification means to another message displayed on the message list screen, and the response message sending means may be means for sending the response message as a response to the message to which the identified message is changed by the identification change means. According thereto, the identification object is able to be changed from the message identified for the response message being input to another message on the message list screen. This enables a response destination of the response message to be changed to a new message received during input of the response message or to an old message, thereby improving user-friendliness. The same applies to the message exchange method and the message exchange program according to the disclosure.

Moreover, the foregoing message exchange device further may comprise: response message receiving means for receiving the response message from any of the other participants; and corresponding message detection means for detecting the message corresponding to the response message received by the response message receiving means from among the messages displayed on the message list screen, and the message display control means may be means for displaying the response message so as to be associated with the message detected by the corresponding message detection means on the message list screen. According thereto, upon receiving the response message from any of the other participants, the message exchange device detects the message corresponding to the response message from among the messages displayed on the message list screen. Thereafter, the message exchange device associates the response message with the detected message and displays the messages on the message list screen and thus is capable of enabling the user to visually recognize the association between the message and the response message on the output side of the response message. Therefore, the receiving device need not to be aware of the input status of the input side as has been conventional, by which the processing in the chat system 1 is able to be simplified. The same applies to the message exchange method and the message exchange program according to the disclosure.

Further, in the foregoing message exchange device, the message display control means may be means for displaying arbitrary association information, which associates the message detected by the corresponding message detection means with the response message, on the message list screen. According thereto, the response message and the message corresponding to the response message are able to be displayed on the message screen so as to be associated with each other by the association information. Therefore, the user is able to visually recognize the association between the message and the response message quickly. The same applies to the message exchange method and the message exchange program according to the disclosure.

Still further, in the message exchange device, the message display control means may be means for displaying the message detected by the corresponding message detection means so as to be near the response message on the message list screen or so as to be superimposed on a part of the response message. According thereto, the message corresponding to the response message is able to be displayed near the response message or displayed superimposed on a part of the response message on the message list screen. Therefore, the user is able to visually recognize the association between the message and the response message quickly. Moreover, even in the case where the response message and the message corresponding to the response message are not able to be displayed within the same message list screen because the input of the response message requires considerable time, the message exchange device is capable of enabling the user to visually recognize the association between the message and the response message. The same applies to the message exchange method and the message exchange program according to the disclosure.

BRIEF DESCRIPTION OF THE DRAWINGS

FIG. 7A is a diagram of the list screen after input start; and FIG. 7B is a diagram of the list screen where a new message is received during the input.

FIG. 10(a) is a diagram of the list screen after input start; and FIG. 10(b) is a diagram of the list screen where a new message is received during the input.

DETAILED DESCRIPTION

According to the disclosure, when a participant inputs a response message, the latest message displayed on a message list screen is identified and the completed response message is sent as a response to the identified message to other participants. Therefore, even in the case of receiving a new message during input of the response message, the participant is able to send back the message as a response message to the response object message. Accordingly, even if other messages exist between the response message and the response object message on the message list screen, the disclosure provides an advantageous effect of clearly displaying the relation. The participant only needs to input the response message to identify the response object message and the response message. Therefore, the participant does not need to select the response object message or the like, by which the operability is improved. Moreover, if the participant starts the input of the response message in a situation where the message required to be a response object and the like are displayed as the latest message on the list screen, the response relation is able to be clearly displayed. Thereby, the participant does not need to set the response object or the like, by which the user-friendliness is improved.

Figure 1:
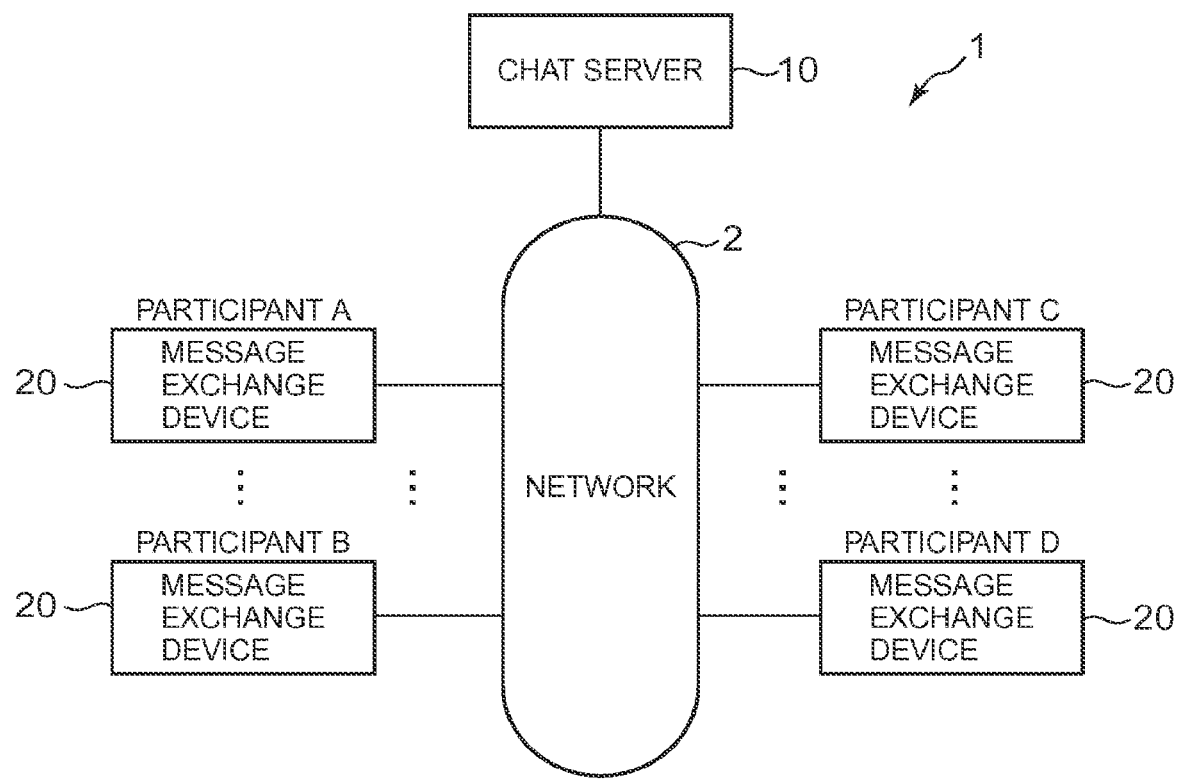
FIG. 1 is a system configuration diagram illustrating the configuration of a chat system including a message exchange device according to the disclosure.
Figure 2:
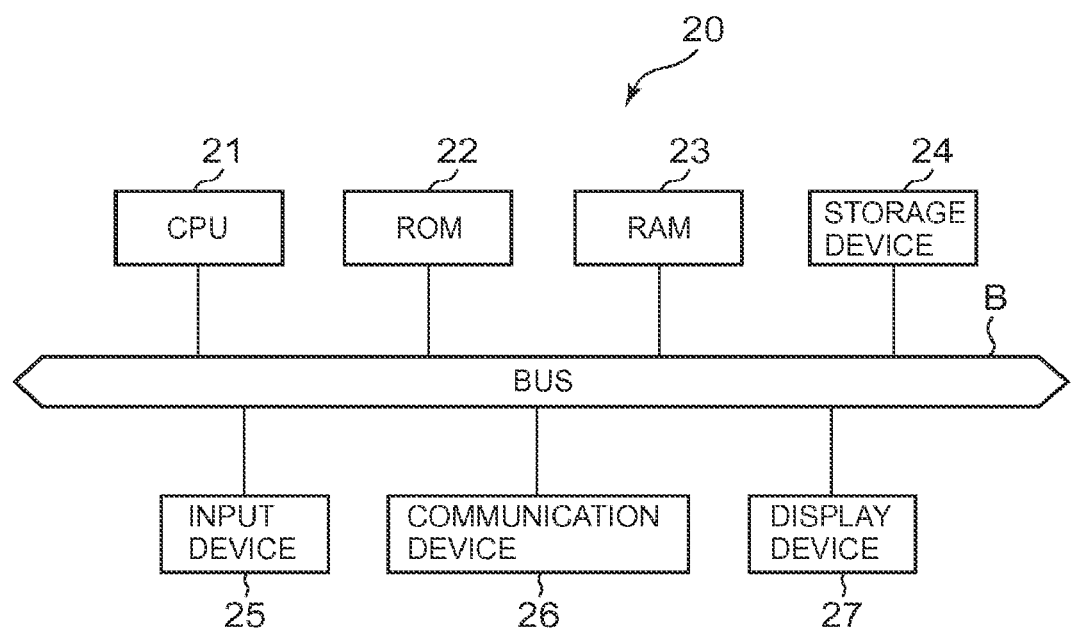
FIG. 2 is a configuration diagram illustrating an example of a schematic configuration of the message exchange device shown in FIG. 1.

Referring to FIG. 1, there is shown a chat system 1 including a chat server 10 and a plurality of message exchange devices 20. The chat server 10 and each of the plurality of message exchange devices 20 are capable of communicating with each other via a network 2. The Internet, a local area network (LAN), or the like is used arbitrarily as the network 2.

First, the chat server 10 is a computer which performs overall control of the entire chat system 1. The chat server 10 monitors the reception of messages generated in response to a user's input from the message exchange devices 20 connected so as to be able to communicate with each other via the network 2. Upon reception of a message from a certain message exchange device 20, the chat server 10 assigns identification information unique within the chat system 1 to the message. The identification information includes, for example, message identification data, a sequence number, and the like. Then, the chat server 10 sends the message and the identification information to other message exchange devices 20. On the other hand, each of the plurality of message exchange devices 20 displays the received message in real time. In this manner, immediately after one of the plurality of users inputs a message from the message exchange device 20, the chat server 10 sends the message to all message exchange devices 20 to enable the plurality of users to exchange messages.

The message is document data or the like input by a user from the message exchange device 20. The message data includes various information added thereto such as a participant (utterer) ID and a sequence number. The message data structure is able to be arbitrarily defined according to a system configuration or the like. Moreover, this embodiment will be described taking an example of a case where the chat server 10 adds the identification information for distinguishing the message. Alternatively, the message exchange device 20 may add the identification information at sending or receiving the message.

Secondly, the message exchange device 20 is a device for exchanging messages with other participants within the chat system 1. More specifically, the message exchange device 20 sends and receives messages to and from message exchange devices 20 used by other participants via the chat server 10. This embodiment will be described taking an example of a case where four participants A, B, C, and D shown in FIG. 1 have a chat using their message exchange devices 20 to simplify the description. Alternatively, three or less or five or more participants may have a chat using the message exchange devices 20.

As the message exchange device 20, there is used a known personal computer (PC) having a central processing unit (CPU) 21 which controls the operations of the entire device based on a predetermined program. The CPU 21 is electrically connected to a ROM 22 which is a read only memory and a RAM 23 which is a memory free to read and write. The ROM 22 stores programs and the like for the CPU 21 via a bus B. The RAM 23 has a work area and the like for storing various data necessary for processing of the CPU 21.

The message exchange device 20 has a storage device 24 electrically connected to the CPU 21 via the bus B. As the storage device 24, there is arbitrarily used, for example, a hard disk drive or a large-capacity memory, which stores a message exchange program according to the present invention described later or sent or received messages.

The message exchange device 20 includes an input device 25, a communication device 26, and a display device 27, each of which is electrically connected to the CPU 21 via the bus B. The input device 25 has a keyboard, mouse, and the like and outputs input data generated according to an operator's operation to the CPU 21.

As the communication device 26, a LAN card, a modem for a cell phone, or other communication equipment is used. The communication device 26 outputs received information to the CPU 21 and sends information input from the CPU 21 to a specified destination. Moreover, as the display device 27, any of various displays may be used such as a known liquid crystal display or television receiver. The display device 27 displays various information such as a list screen under the control of the CPU 21.

Figure 3:
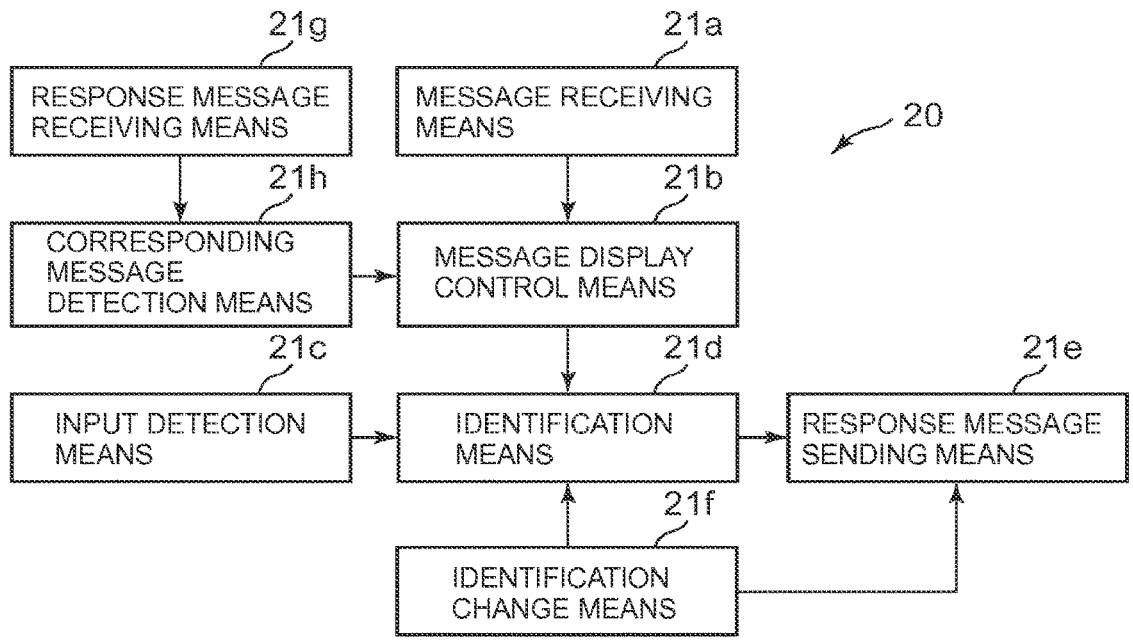
FIG. 3 is a block diagram illustrating a functional block configuration of the CPU shown in FIG. 2.

Then, as shown in FIG. 3, the storage device 24 of the message exchange device 20 described above stores a message exchange program for causing the CPU 21 (computer) to function as message receiving means 21a, message display control means 21b, input detection means 21c, identification means 21d, response message sending means 21e, identification change means 21f, response message receiving means 21g, corresponding message detection means 21h, and other various means. The CPU 21 executes the message exchange program and thereby functions as these various means. The message exchange program includes programs for message receiving processing shown in FIG. 5, response processing shown in FIG. 6, and other various processing programs.

Subsequently, description will be made giving an example of the relationship between a message stored in the storage device 24 of the message exchange device 20 and a response message to the message with reference to FIG. 4.

Figure 4:
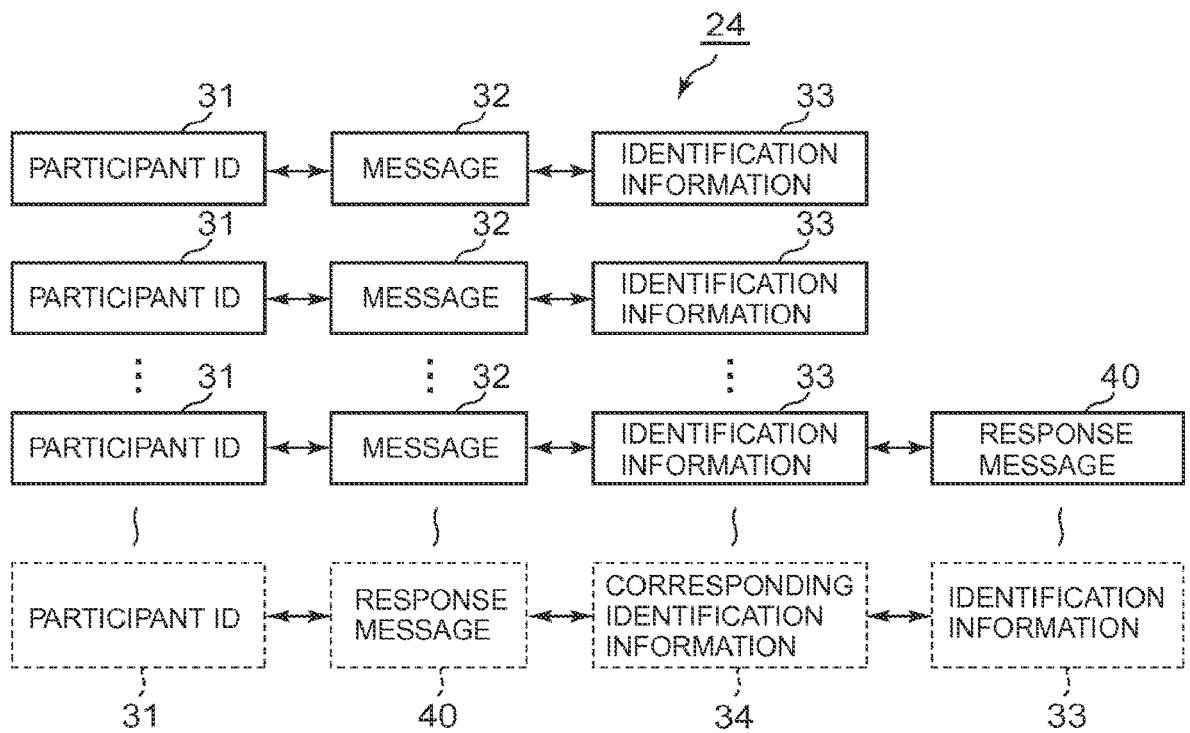
FIG. 4 is a diagram for describing the identification of a message and a response message.

As shown in FIG. 4, the storage device 24 has a storage area for storing a participant ID 31, a message 32, and identification information 33 received from the chat server 10 in the time series so as to be associated with each other. The participant ID 31 is used to identify a participant who sent the message 32. The message 32 is document data or the like as described above.

In this embodiment, description will be made giving an example of a case where the identification information 33 is a message ID. Alternatively, the identification information 33 may have various data structures if the message 32 is identifiable with a combination between the participant ID 31 and the message 32.

Upon the start of the input of a response message 40, the storage device 24 associates the identification information 33 associated with the latest message 32 at the input time with the response message 40 and stores the identification information 33 and the response message 40. This embodiment will be described for a case of identifying the response message 40 and the message 32 to be a response object by associating the response message 40 with the identification information 33. Alternatively, various embodiments may be implemented such that the response message 40 is associated with all of the participant ID 31, the message 32, and the identification information 33.

In this embodiment, the message exchange device 20 adds the identification information 33 associated with the response message 40 to the response message 40 as corresponding identification information 34 before sending the response message 40 to the chat server 10. Further, the message exchange device 20 adds the participant ID 31 to the response message 40. Moreover, upon receiving the response message 40, the storage device 24 stores the participant ID 31 added to the response message 40 and the corresponding identification information 34 so as to be associated with each other.

Figure 7:
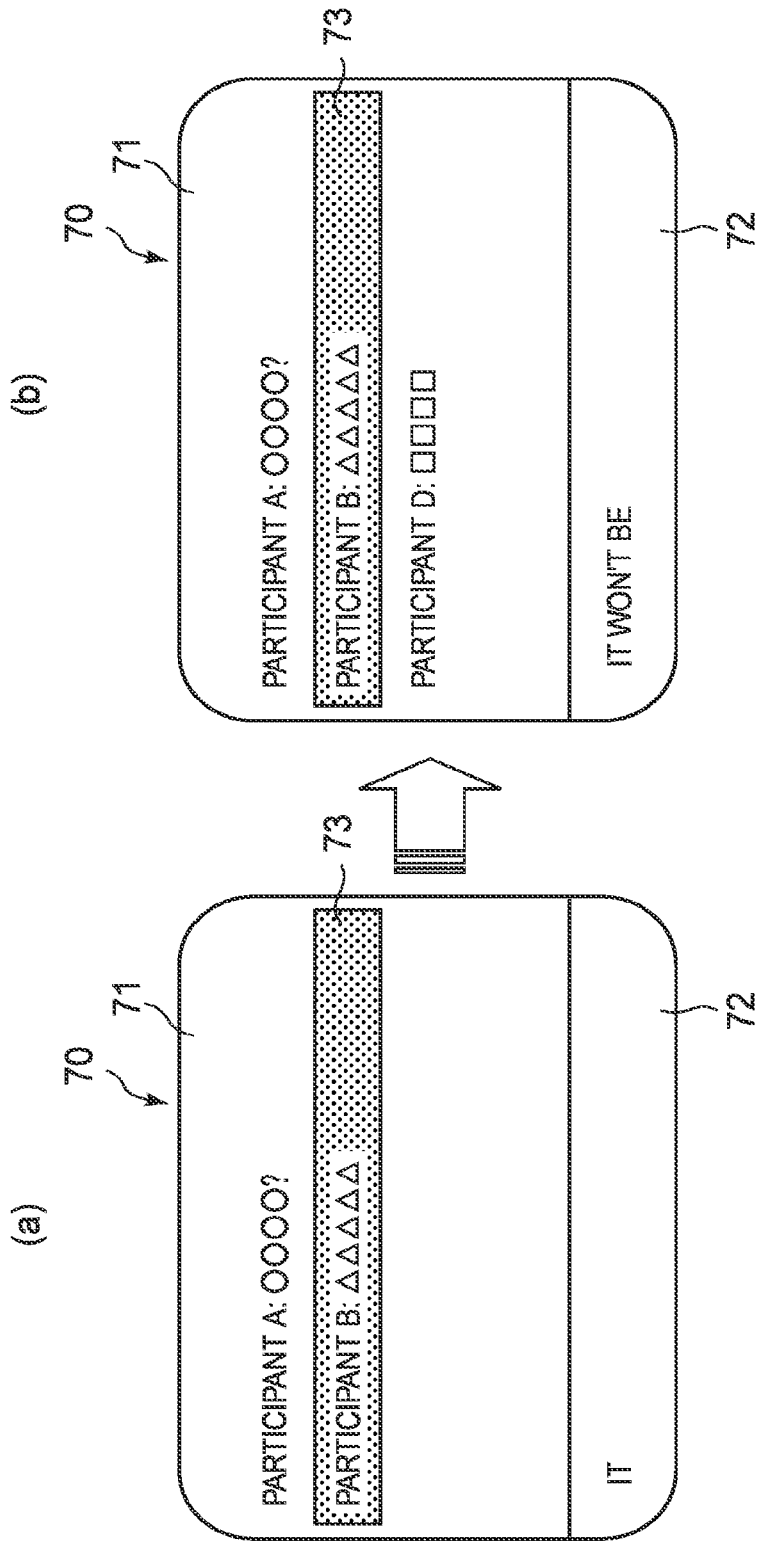
FIG. 7 is a diagram illustrating an example of a list screen.
Figure 8:
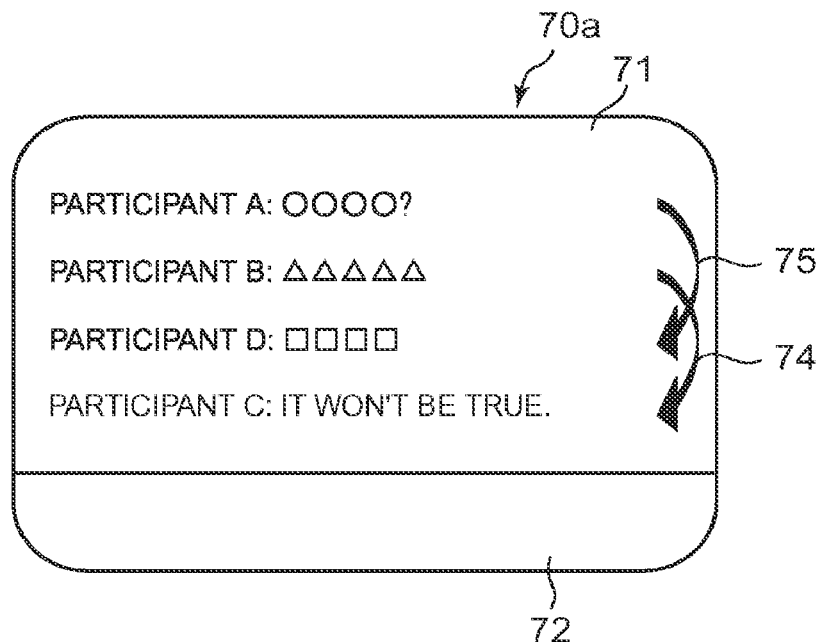
FIG. 8 is a diagram illustrating an example of a list screen showing association between the response message and the response object message.
Figure 9:
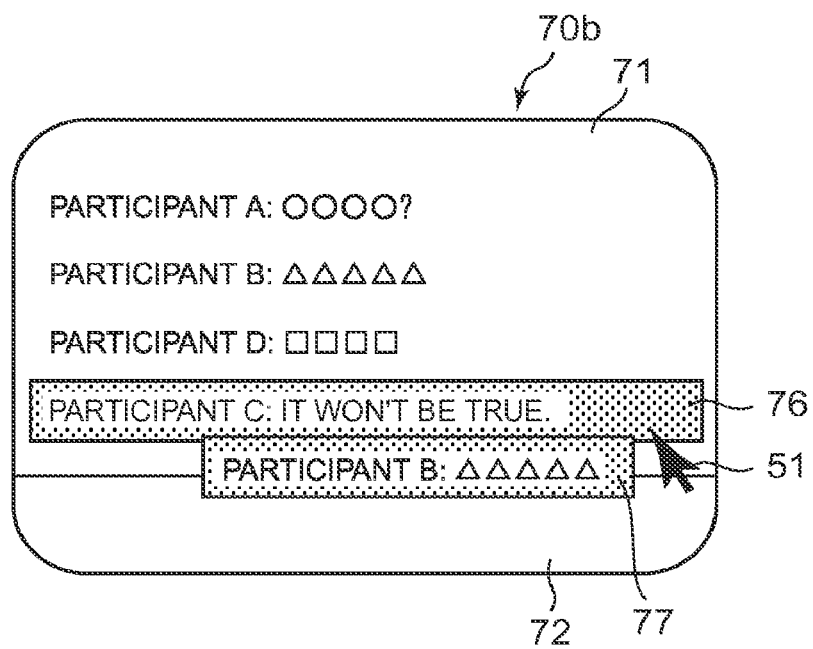
FIG. 9 is a diagram illustrating another example of a list screen showing association between the response message and the response object message.
Figure 10:
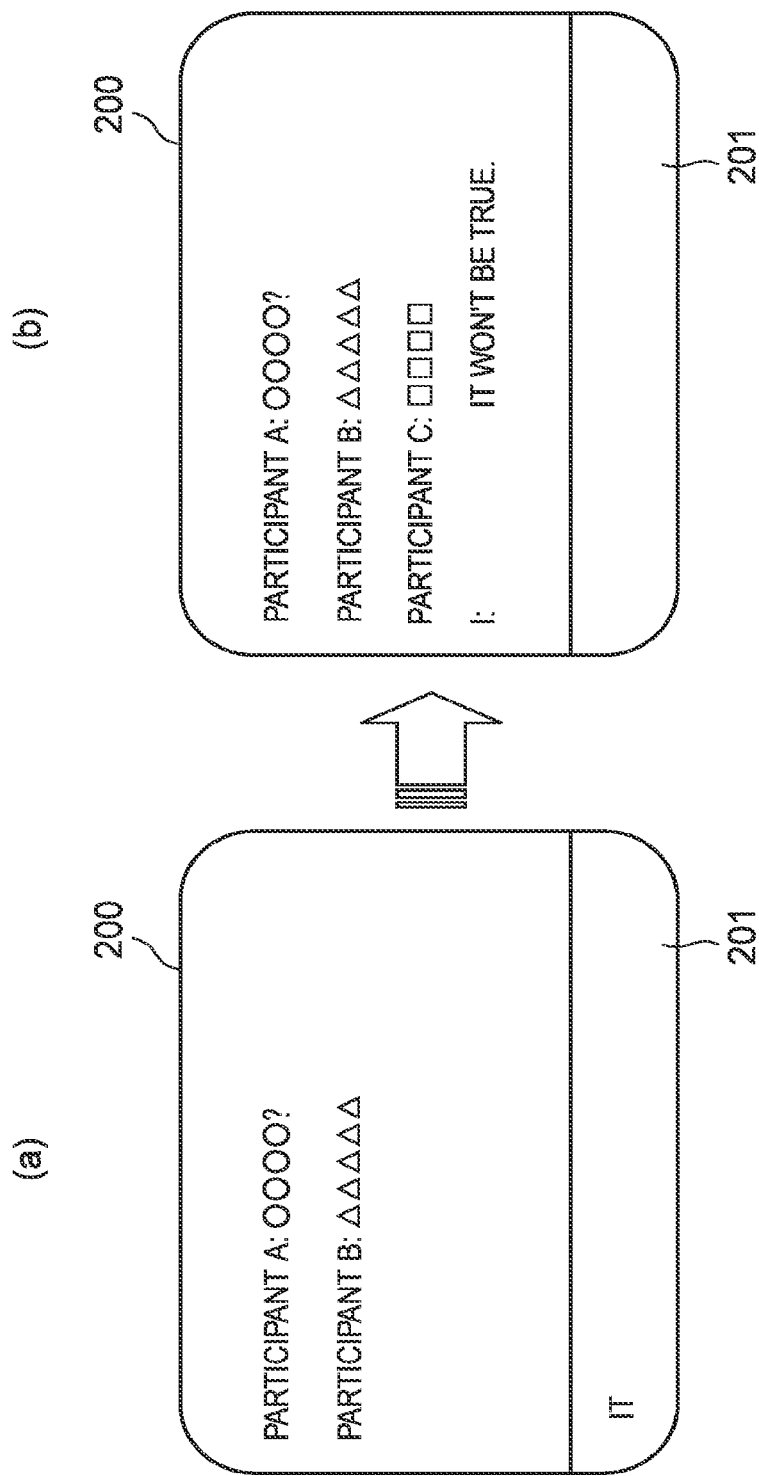
FIG. 10 (Prior Art) is a diagram for describing a problem on a conventional list screen.

Subsequently, description will be made taking an example of the list screen displayed on the display device 27 of the message exchange device 20 described above with reference to FIGS. 7 to 9. In FIGS. 7 to 9, a list screen 70 includes a message display region 71 and an input field 72 of the response message 40. The message display region 71 lists participants and their messages 32 combined with each other. The input field 72 allows each participant to input data of the response message 40 and the like using the input device 25. The data input to the input field 72 is output from the input device 25 to the CPU 21.

Figure 5:
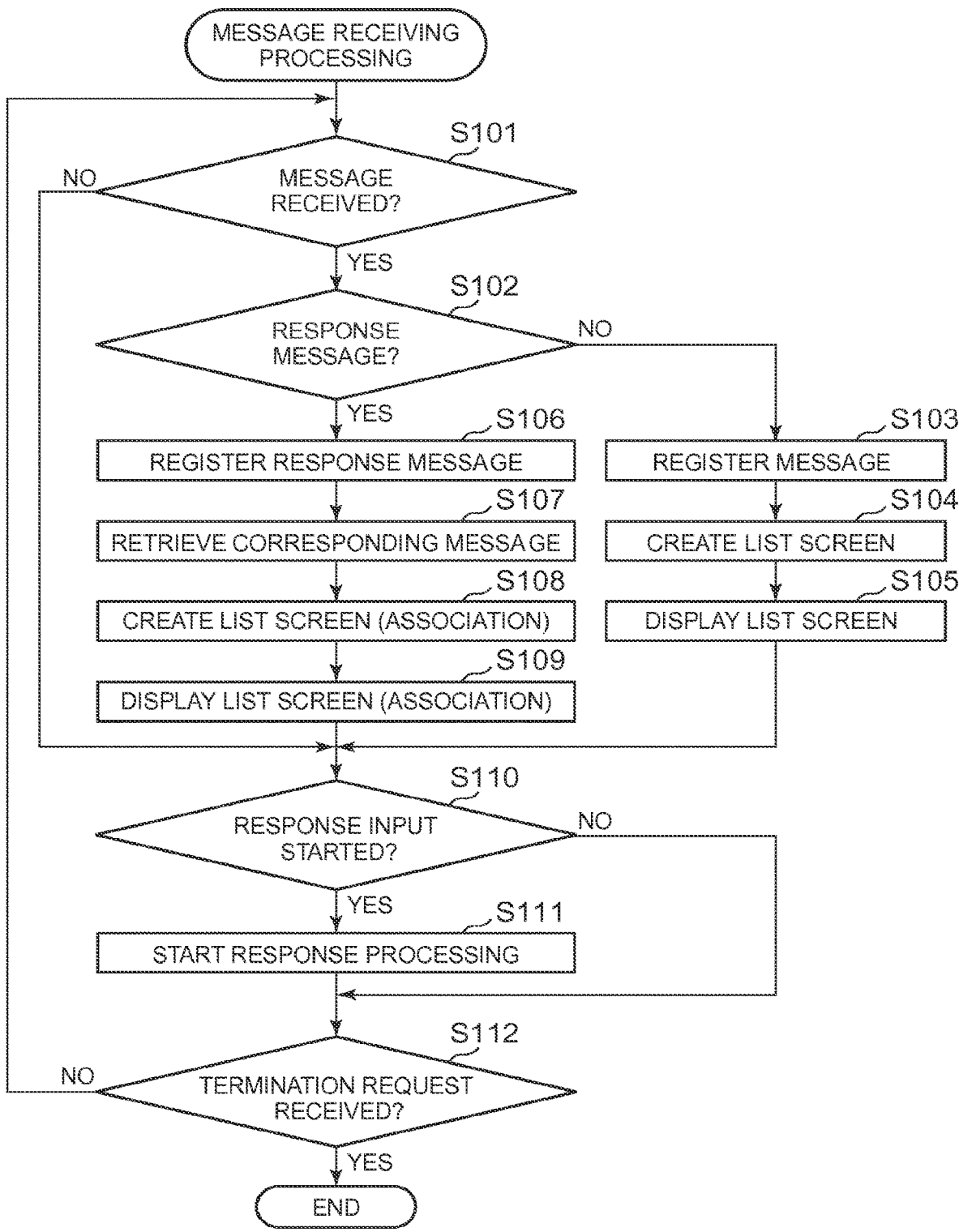
FIG. 5 is a flowchart illustrating an example of message receiving processing performed by the CPU shown in FIG. 2.

The following describes an example of message receiving processing according to the present invention performed by the CPU 21 of the foregoing message exchange device 20 with reference to a flowchart shown in FIG. 5. The message receiving processing is started from a high-order module by the execution of the message exchange program by each of the participants A to D. The message receiving processing terminates at a termination request from each of the participants A to D. Moreover, the description of processing not related to the present invention will be omitted to simplify the description.

The CPU 21 determines whether the message 32 is received from another message exchange device 20 via the communication device 26 (S101). If the CPU 21 determines that the message 32 is not received (NO in S101), the CPU 21 proceeds to the process of step S110. On the other hand, if the CPU 21 determines that the message 32 is received (YES in S101), the CPU 21 proceeds to the process of step S102.

The CPU 21 determines whether the message 32 is the response message 40 on the basis of whether the corresponding identification information 34 is associated with the message 32 in the sending device (S102). In this embodiment, if the corresponding identification information 34 is added to the message 32, the message 32 is determined to be the response message 40; and unless the corresponding identification information 34 is added to the message 32, the message 32 is determined to be a normal message 32.

Regarding the determination of the response message 40, various embodiments may be implemented such that, for example, an identification flag is attached to the header or the like of the message 32 or that one message exchange device 20 notifies the chat server 10 of whether the message 32 is a response and the chat server 10 notifies other message exchange devices 20 of whether the message 32 is a response.

If the CPU 21 determines that the message 32 is not the response message 40 (No in S102), the CPU 21 proceeds to step S103. The CPU 21 associates the participant ID 31, the message 32, and the identification information 33 received from the chat server 10 with each other and sequentially stores them (S103: the message receiving means 21*a*) and then proceeds to the process of step S104. As a result, the storage device 24 stores the participant ID 31, the message 32, and the identification information 33 as a set in the time series as shown in FIG. 4.

The CPU 21 creates the list screen 70 based on the plurality of messages 32 and the like stored in the storage device 24 or the like (S104). The CPU 21 requires the display device 27 to display the created list screen 70 (S105: the message display control means 21*b*) and then proceeds to the process of step S110. As a result, the display device 27 displays the list screen 70 showing the currently received message at the end of the list of the plurality of messages 32.

Further, if the CPU 21 determines that the received message 32 is the response message 40 in the process of step S102 (YES in S102), the CPU 21 proceeds to the process of step S106. The CPU 21 associates the response message 40 received from the chat server 10, the participant ID 31, the corresponding identification information 34 added to the response message 40, and the identification information 33 currently assigned by the chat server 10 with each other and sequentially stores them in the storage device 24 (S106: the response message receiving means 21*g*). Thereafter, the CPU 21 proceeds to the process of step S107.

The CPU 21 retrieves the message 32 indicated by the corresponding identification information 34 added to the received response message 40 from among the plurality of messages 32, response messages 40, and the like stored in the storage device 24 (S107: the corresponding message detection means 21*h*). Note that description is omitted regarding processing performed when the CPU 21 is not able to retrieve the corresponding message 32.

The CPU 21 creates the list screen 70 on the basis of the plurality of messages 32, response messages 40, and the like stored in the storage device 24 or the like. Then, the CPU 21 creates a list screen (association) 70*a* (S108) by adding association information (for example, information indicated by arrows) 74 and 75, which associates the response message with the corresponding message 32 within the list screen 70, to the list screen 70. The CPU 21 requires the display device 27 to display the created list screen (association) 70*a* (S109: the message display control means 21*b*) and then proceeds to the process of step S110. As a result, the display device 27 displays the list screen (association) 70*a* on which the response message 40 is associated with the corresponding message 32 by using the association information 74 and 75 on the list of the plurality of messages 32.

The CPU 21 determines whether a response input is started in the input field 72 on the basis of whether the input data in the input field 72 is input from the input device 25 (S110: the input detection means 21*c*). If the CPU 21 determines that the response input is not started (NO in S110), the CPU 21 proceeds to the process of step S112.

On the other hand, if the CPU 21 determines that the response input is started (YES in S110), the CPU 21 proceeds to the process of step S111. The CPU 21 starts the response processing shown in FIG. 6 and then proceeds to the process of step S112. This process enables the CPU 21 to perform the message receiving processing shown in FIG. 5 and the response processing shown in FIG. 6 simultaneously. An example of the response processing will be described later.

The CPU 21 determines whether a termination request is received from the high-order module (S112). If the CPU 21 determines that the termination request is not received (NO in S112), the CPU 21 returns to the process of step S101 to repeat the series of processes. On the other hand, if the CPU 21 determines that the termination request is received (YES in S112), the CPU 21 terminates the message receiving processing.

A controller 16 performs the message receiving processing shown in FIG. 5 described above and thereby the CPU 21 functions as the message receiving means 21*a*, the message display control means 21*b*, the input detection means 21*c*, the response message receiving means 21*g*, and the corresponding message detection means 21*h* shown in FIG. 3 and described above. These means correspond to a message receiving process, a message display control process, an input detection process, a response message receiving process, and a corresponding message detection process, respectively.

Figure 6:
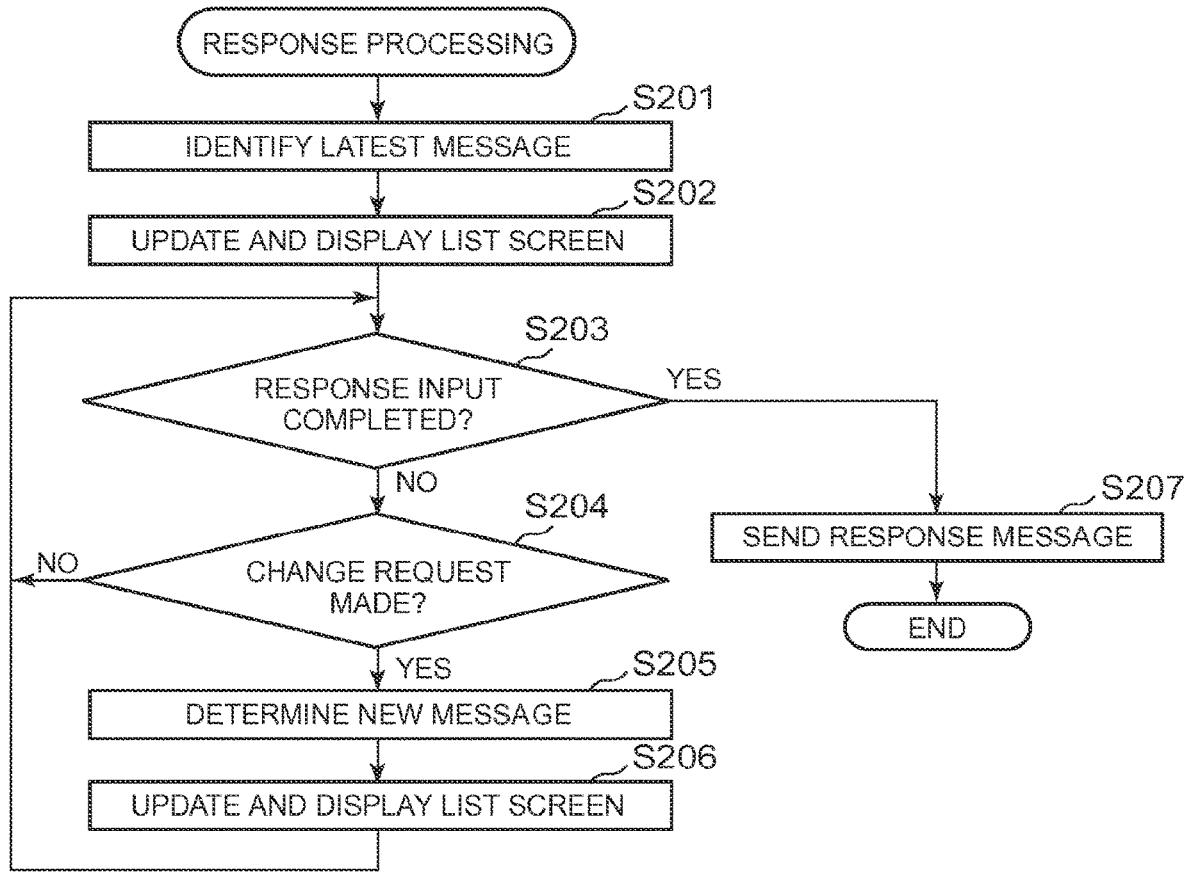
FIG. 6 is a flowchart illustrating an example of response processing performed by the CPU shown in FIG. 2.

The following describes an example of the response processing called by the foregoing message receiving processing with reference to the flowchart shown in FIG. 6.

First, the CPU 21 determines the latest message from among the messages 32, the response messages 40, and the like stored in the storage device 24, identifies the identification information 33 of the latest message and the response message 40 being input (S201: the identification means 21$d$), and then proceeds to the process of step S202. The latest message may be either of a message 32 and a response message 40.

The CPU 21 updates the list screen 70 displayed on the display device 27 so that the latest message portion is displayed as a highlighted portion 73 (S202) and then proceeds to step S203. This process enables the display device 27 to highlight the participant B and his/her message 32 by the highlighted portion 73, for example, as shown in FIG. 7. The highlighting enables the participants A to D to quickly check the message 32 and the like identified in response to the input of the response message 40. Further, even if a new message is received during input operation and the message list screen is updated, a user is able to quickly distinguish the message which is the response object from among the messages on the message list screen.

The CPU 21 determines whether the response input is completed in the input field 72 on the basis of whether defined data in the input field 72 is input from the input device 25 (S203). If the CPU 21 determines that the response input is not completed (NO in S203), the CPU 21 proceeds to the process of step S204.

The CPU 21 determines whether a change request has been made on the response object of the response message 40 via the input device 25 (S204). Regarding the input method of the change request, it is assumed that the participant inputs the change request, for example, by a predetermined input operation, on a predetermined selection screen, or the like. If the CPU 21 determines that no change request has been made (NO in S204), the CPU 21 returns to the process of step S203 and repeats the series of processes. On the other hand, if the CPU 21 determines that the change request has been made (YES in S204), the CPU 21 proceeds to the process of step S205.

After the input of the change request, the CPU 21 determines a message 32 and the like selected anew by the participant on the list screen 70 on the basis of the input data from the input device 25 (S205). The CPU 21 changes the identification destination of the response message 40 in the storage device 24 to the identification information 33 corresponding to the determined message 32. In addition, the CPU 21 changes and updates the list screen 70 displayed on the display device 27 so that the identified message 32 and the like are shown as the highlighted portion 73 (S206: the identification change means 21$f$) and then returns to step S203 to repeat the series of processes.

In this manner, the identification object is able to be changed from the identified message 32 and the like for the response message 40 being input to another message on the list screen 70. An example of this change will be described hereinafter in a case where the message 32 of the participant B is displayed as the latest message on the list screen 70 as shown in FIG. 7A. If the input of the response message 40 is started in the state shown in FIG. 7A, the message 32 of the participant B is identified as a response destination. Thereafter, if the response destination is required to be changed to the message 32 of the participant A, the item of the message 32 of the participant A is selected on the list screen 70, by which the message exchange device 20 changes the response destination from the participant B to the participant A. Therefore, the response destination of the response message 40 is able to be changed to the new message 32 received during input of the response message 40, an old message 32 on the list screen 70, or the like, which thereby improves user-friendliness.

Moreover, if the CPU 21 determines that the response input is completed in the process of step S203 (YES in S203), the CPU 21 proceeds to the process of step S207. The CPU 21 adds the identification information 33 of the identified message 32, as the corresponding identification information 34, to the response message 40 which has completed to be input. In addition, the CPU 21 sends the response message 40 and the corresponding identification information 34 to the chat server 10 via the communication device 26 (S207: the response message sending means 21$e$) and then terminates the response processing.

The controller 16 performs the response processing shown in FIG. 6 described above and thereby the CPU 21 functions as the identification means 21$d$, the response message sending means 21$e$, and the identification change means 21$f$ shown in FIG. 3 and described above. These means correspond to an identification process, a response message sending process, and an identification change process, respectively.

The following describes an example of the operation (action) of the message exchange device 20 in the foregoing chat system 1 with reference to FIGS. 7 and 8. This description will be made on a case where the participants A to D chat with each other.

The participant A sends a message 32 "oooo?" to the chat server 10 by using the message exchange device 20. The chat server 10 transfers the message 32, the participant ID 31, and the identification information 33 to the message exchange devices 20. As a result, each of the plurality of message exchange devices 20 displays "Participant A: oooo?" in the message display region 71 of the list screen 70 as shown in FIG. 7A.

Similarly, the participant B sends a message 32 "ΔΔΔΔΔ" to the chat server 10 by using the message exchange device 20. As a result, each of the plurality of message exchange devices 20 displays "Participant B: ΔΔΔΔΔ" subsequently to the "Participant A: oooo?" in the message display region 71 of the list screen 70 as shown in FIG. 7A.

While these messages are displayed, the participant C starts the input of a response message 40 in the input field 72 of the list screen 70 from the input device 25. Thereby, the message exchange device 20 of the participant C identifies the message 32 of the participant B, which is the latest message 32 on the list screen 70, and the response message 40. Thereafter, the message exchange device 20 causes the display device 27 to update and display the list screen 70 so that the message 32 of the participant B as the identification destination is the highlighted portion 73 on the list screen 70. It is assumed, however, that the highlighted portion 73 is displayed only on the list screen 70 of the message exchange device 20 of the participant C, but not displayed on the list screens 70 of the message exchange devices 20 of the participants A, B, and D. Thereby, even if the participants A, B, and D respectively input the response messages 40 to different messages 32, the message exchange devices 20 of the participants A, B, and D are each able to display the highlighted portion 73 based on the input of the corresponding response message 40.

Then, the message exchange device 20 of the participant C receives the message 32 of the participant D from the chat server 10 during the input operation of the response message 40 of the participant C. The message exchange device 20 displays "Participant D: ☐☐☐☐" subsequently to "Participant B: ΔΔΔΔΔ" in the message display region 71 as shown in FIG. 7B. The list screen 70 continues to display the highlighted portion 73 also after displaying the message 32 of the participant D as shown in FIG. 7B.

Thereafter, upon detecting the completion of input of the response message 40, the message exchange device 20 of the participant C sends the response message 40, the corresponding identification information 34, and the participant ID 31 to the chat server 10. The chat server 10 sends the response message 40, the corresponding identification information 34, the participant ID 31, and the identification information 33 added anew to the plurality of message exchange devices 20.

The plurality of message exchange devices 20 each receive the response message 40 and the corresponding identification information 34. Each of the message exchange devices 20 detects the message 32 corresponding to the response message 40 from among the plurality of messages 32 having been received before on the basis of the corresponding identification information 34. The message exchange device 20 displays the list screen (association) 70a on which the response message 40 is associated with the corresponding message 32 by using the association information 74 and 75 as shown in FIG. 8.

This display enables the participants to recognize that the message 32 of the participant C is the response message 40 to the participant B located above the participant D on the list screen 70a. In this embodiment, the association information 75 represents the response relation of the participant D located just above the response message 40 of the participant C to improve the visibility. Alternatively, any other various display modes may be employed such that the association information 74 represents only the association of the latest message 32.

According to the message exchange device 20 described hereinabove, when the participant B inputs the response message 40, the message exchange device 20 identifies the latest message 32 and the like displayed on the list screen 70 and sends the completed response message 40 as a response to the identified message 32 and the like to other participants A, C, and D. Therefore, even if the participant receives a new message 32 during input of the response message 40, the participant is able to send back the response message 40 as a response to the response object message 32 and the like. Therefore, the present invention provides an advantageous effect of clearly displaying the response relation even if other messages 32 and the like exist between the response message 40 and the response object message 32 and the like on the list screen 70a. Moreover, the message exchange device 20 identifies the response object message 32 and the like and the response message 40 only by the input of the response message 40 performed by any of the participants A to D and therefore the participants A to D need not select the response object message 32 and the like, thereby improving the operability. Further, if any of the participants A to D starts to input the response message 40 while the message 32 and the like required to be a response object is displayed as the latest message 32 and the like on the list screen 70, the response relation is able to be clearly displayed. Thereby, the participants do not need to make settings or the like uselessly, thereby improving user-friendliness.

Further, the foregoing message exchange device 20 adds the corresponding identification information 34 for distinguishing the message 32 and the like, which is identified for the response message 40, to the response message 40 before sending back the response message 40. According to this feature, the response message 40 sent back has the corresponding identification information and therefore the receiving device of the response message 40 is able to detect the corresponding message 32 and the like on the basis of the corresponding identification information, thereby enabling the simplification of the processing.

Still further, upon receiving a response message 40 from any other participant, the foregoing message exchange device 20 detects the message 32 and the like corresponding to the response message 40 from among the messages 32 and the like displayed on the list screen 70. Thereafter, the message exchange device 20 displays the response message 40 associated with the detected message 32 and the like on the list screen 70a and therefore is capable of enabling the participant to visually recognize the association between the message 32 and the like and the response message 40 on the output side of the response message 40. Accordingly, the participant does not need to be aware of the input status as has been conventional, by which processing in the chat system 1 is simplified.

Further, the message exchange device 20 has been described above on the case where the response message 40 is associated with the response object message 32 and the like by using the association information 74 and 75 on the list screen 70. Alternatively, the message exchange device 20 is able to employ other various display modes such that the message corresponding to the response message 40 is displayed near the response message or displayed superimposed on a part of the response message 40.

For example, as shown in FIG. 9, the message exchange device 20 displays the received response message 40 as a highlighted portion 76 on a list screen 70b. The message exchange device 20 displays a response object display portion 77 so as to be superimposed on a part of the highlighted portion 76 when a mouse pointer 51 of the input device 25 is placed on the highlighted portion 76 or when the selection with the mouse pointer 51 is detected. The response object display portion 77 includes a participant and his/her message 32. In this display mode, the response object message 32 and the like is able to be displayed near or partially superimposed on the response message 40 on the list screen 70 and therefore the participants A to D do not need to find the response object message 32 and the like from the plurality of messages 32 and the like. Hence, even in the case where the response message and the corresponding message are not able to be displayed within the same list screen 70 because the input of the response message 40 requires considerable time, the message exchange device 20 is capable of enabling the participants A to D to visually recognize the association between the message 32 and the like and the response message 40. Note that the highlighted portion 76 does not need to be displayed each time the response message 40 is received. For example, instead of displaying the highlighted portion 76 on the list screen 70b, the message exchange device 20 may display the highlighted portion 76 and the response object display portion 77 when the mouse pointer 51 is placed on the message 32 on the list screen 70b.

The above-described embodiments are merely exemplary implementations of the present invention, but the present invention is not limited to the embodiments. In other words, the present invention may be changed in various ways without departing from the gist of the present invention.

What is claimed is:

1. A message exchange method of exchanging messages with other participants in a chat session, comprising:
    receiving a plurality of messages from a set of two or more participants in a chat session, wherein said plurality of messages comprise at least a first message from a first one of the participants and a second message from a second one of the participants, wherein said first message is received before the second message;
    updating and displaying the first and second messages sequentially on a message list screen each time one of the messages is received, wherein the first message is displayed in sequence before the second message;
    detecting initiation of input of a response message after the first message was received and before the second message was received, which is an indication that the response message is a response to the first message;
    identifying the first message among the messages displayed on the message list screen as being a message to which the response message is a response based on a time of the detection of the input being initiated by identifying an association with the response message of identification information associated with the first message responsive to the first message being a latest received message at a time the input of the response message is initiated and before the response message is communicated, the identification information associated with the first message being stored in response to a start of an input of the response message;
    displaying the first message so as to be distinguishable from other messages on the message list screen by showing arrows from the first message to the response message even though the second message is shown sequentially within the users interfaces of the set of two or more participants between the first message and the response message; and
    sending the response message to the set of two or more participants as a response to the message identified upon completion of input of the response message wherein the response message details that the first message is the one of the plurality of messages to which the response is made, wherein user interfaces of the set of two or more participants are configured to visually show that the response message is a response for the first message even though the second message is shown sequentially after the first message and is shown sequentially before the response message within the user interfaces of the two or more participants.

2. The message exchange method according to claim 1, wherein the sending of the response message to the other participants further comprises:
    adding corresponding identification information for distinguishing the message, which is identified for the response message, to the response message before sending the response message; and
    within the message list screen highlighting the first message while the response message is being input and before the response message is sent as a visual indicator to a user entering the response message to indicate the response message is in response to the first message and not the second message.

3. The message exchange method according to claim 1, further comprising:
    changing the message identified for the response message from the message identified in the identification step to another message displayed on the message list screen, wherein the sending of the response message to the other participants further comprises:
    sending the response message as a response to the message to which the identified message is changed in the identification change means.

4. The message exchange method according to claim 1, further comprising:
    receiving the response message from any of the other participants; and
    detecting the message corresponding to the response message received in the response message receiving step from among the messages displayed on the message list screen, wherein the updating and displaying of the messages comprises:
    displaying the response message so as to be associated with the detected message on the message list screen.

5. The message exchange method according to claim 4, wherein the updating and displaying of the messages comprises:
    displaying arbitrary association information, which associates the detected message with the response message, on the message list screen.

6. The message exchange method according to claim 1, further comprising:
    determining a request for changing the message identified for the response message from the first message identified in the identification step to another message displayed on the message list screen, wherein the request for changing the message is determined based on at least one of a predetermined input operation and a predetermined selection screen.

7. A message exchange program stored on a storage medium, wherein the storage medium is not a transitory, propagating signal per se, for causing a computer of a message exchange device, which exchanges messages with other participants, to function as:
    message receiving means for receiving a plurality of messages from a set of two or more participants in a chat session, wherein said plurality of message comprise at least a first message from a first one of the participants and a second message from a second one of the participants, wherein said first message is received before the second message;
    message display control means for updating and displaying the first and second messages sequentially on a message list screen each time one of the messages is received, wherein the first message is displayed in sequence before the second message;
    input detection means for detecting initiation of input of a response message after the first message was received and before the second message was received, which is an indication that the response message is a response to the first message;
    identification means for identifying the first message among the messages displayed on the message list screen, as being a message to which the response message is a response based on a time of the detection of the input being initiated by identifying an association with the response message of identification information associated with the first message responsive to the first message being a latest received message at a time the input of the response message is initiated and before the response message is communicated, the identification information associated with the first message being stored in response to a start of an input of the response message;

the message display control means displaying the first message so as to be distinguishable from other messages on the message list screen by showing arrows from the first message to the response message even though the second message is shown sequentially within the users interfaces of the set of two or more participants between the first message and the response message; and response message sending means for sending the response message to the set of two or more participants as a response to the message identified upon completion of input of the response message wherein the response message details that the first message is the one of the plurality of messages to which the response is made, wherein user interfaces of the set of two or more participants are configured to visually show that the response message is a response for the first message even though the second message is shown sequentially after the first message and is shown sequentially before the response message within the user interfaces of the two or more participants.

8. The message exchange program according to claim 7, wherein the response message sending means functions as means for adding corresponding identification information for distinguishing the message, which is identified for the response message, to the response message before sending the response message, wherein the message list screen highlights the first message while the response message is being input and before the response message is sent as a visual indicator to a user entering the response message to indicate the response message is in response to the first message and not the second message.

9. The message exchange program according to claim 7, the program further causing the computer of the message exchange device to function as identification change means for changing the message identified for the response message from the message identified by the identification means to another message displayed on the message list screen, wherein the response message sending means functions as means for sending the response message as a response to the message to which the identified message is changed by the identification change means.

10. The message exchange program according to claim 7, the program further causing the computer of the message exchange device to function as:

response message receiving means for receiving the response message from any of the other participants; and corresponding message detection means for detecting the message corresponding to the response message received by the response message receiving means from among the messages displayed on the message list screen, wherein the message display control means functions as means for displaying the response message so as to be associated with the message detected by the corresponding message detection means on the message list screen.

11. The message exchange program according to claim 10, wherein the message display control means is means for displaying arbitrary association information, which associates the message detected by the corresponding message detection means with the response message, on the message list screen.

12. The message exchange program according to claim 7, the program further causing the computer of the message exchange device to function as a determining means for determining a request for changing the message identified for the response message from the first message identified by the identification means to another message displayed on the message list screen, wherein the request for changing the message is determined based on at least one of a predetermined input operation and a predetermined selection screen.

13. A message exchange device for exchanging messages with other participants, comprising:

one or more processors;

one or more non-transitory storage mediums storing program instructions executable by the one or more processors;

message receiving code, which is a subset of the program instructions, for receiving a plurality of messages from a set of two or more participants in a chat session, wherein said plurality of message comprise at least a first message from a first one of the participants and a second message from a second one of the participants, wherein said first message is received before the second message;

message display control code, which is a subset of the program instructions, for updating and displaying the first and second messages sequentially on a message list screen each time one of the messages is received, wherein the first message is displayed in sequence before the second message;

input detection code, which is a subset of the program instructions, for detecting initiation of input of a response message after the first message was received and before the second message was received, which is an indication that the response message is a response to the first message;

identification code, which is a subset of the program instructions, for identifying the first message among the messages displayed on the message list screen, as being a message to which the response message is a response based on a time of the detection of the input being initiated by identifying an association with the response message of identification information associated with the first message responsive to the first message being a latest received message at a time the input of the response message is initiated and before the response message is communicated, the identification information associated with the first message being stored in response to a start of an input of the response message;

the message display control code displaying the first message so as to be distinguishable from other messages on the message list screen by showing arrows from the first message to the response message even though the second message is shown sequentially within the users interfaces of the set of two or more participants between the first message and the response message; and response message sending code, which is a subset of the program instructions, for sending the response message to the set of two or more participants as a response to the message identified upon completion of input of the response message wherein the response message details that the first message is the one of the plurality of messages to which the response is made, wherein user interfaces of the set of two or more participants are configured to visually show that the response message is a response for the first message even though the second message is shown sequentially after the first message and is shown sequentially before the response message within the user interfaces of the two or more participants.

14. The message exchange device according to claim 13, wherein the response message sending means is means for adding corresponding identification information for distinguishing the message, which is identified for the response message, to the response message before sending the response message, and wherein the message list screen highlights the first message while the response message is being input and before the response message is sent as a visual indicator to a user entering the response message to indicate the response message is in response to the first message and not the second message.

15. The message exchange device according to claim 13, further comprising identification change means for changing the message identified for the response message from the message identified by the identification means to another message displayed on the message list screen, wherein the response message sending means is means for sending the response message as a response to the message to which the identified message is changed by the identification change means.

16. The message exchange device according to claim 13, further comprising:
response message receiving means for receiving the response message from any of the other participants; and corresponding message detection means for detecting the message corresponding to the response message received by the response message receiving means from among the messages displayed on the message list screen, wherein the message display control means is means for displaying the response message so as to be associated with the message detected by the corresponding message detection means on the message list screen.

17. The message exchange device according to claim 16, wherein the message display control means is means for displaying arbitrary association information, which associates the message detected by the corresponding message detection means with the response message, on the message list screen.

18. The message exchange device according to claim 13, further comprising:
determining means for determining a request for changing the message identified for the response message from the first message identified by the identification means to another message displayed on the message list screen, wherein the request for changing the message is determined based on at least one of a predetermined input operation and a predetermined selection screen.

* * * * *